(12) United States Patent
Kurtz et al.

(10) Patent No.: US 6,523,415 B2
(45) Date of Patent: Feb. 25, 2003

(54) HIGH PRESSURE PIEZORESISTIVE TRANSDUCER SUITABLE FOR USE IN HOSTILE ENVIRONMENTS AND METHOD FOR MAKING THE SAME

(75) Inventors: Anthony D. Kurtz, Ridgewood, NJ (US); Andrew Bemis, Upper Saddle River, NJ (US); Timothy Nunn, Ridgewood, NJ (US); Joseph Van De Weert, Cliffside Park, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 09/922,621

(22) Filed: Aug. 6, 2001

(65) Prior Publication Data

US 2002/0000127 A1 Jan. 3, 2002

Related U.S. Application Data

(62) Division of application No. 09/245,158, filed on Feb. 4, 1999, now Pat. No. 6,272,929.

(51) Int. Cl.[7] .............................. G01L 9/06; H04R 17/00
(52) U.S. Cl. ........................................ 73/727; 29/25.35
(58) Field of Search ................ 73/715–727; 438/48–53; 29/25.35, 25.41; 361/283.1–283.4

(56) References Cited

U.S. PATENT DOCUMENTS

| 4,578,735 A | 3/1986 | Knecht et al. ............... 361/283 |
| 5,702,619 A | 12/1997 | Kurtz et al. .................... 216/2 |

*Primary Examiner*—William Oen
(74) *Attorney, Agent, or Firm*—Duane Morris LLP

(57) ABSTRACT

A pressure transducer including: a silicon substrate including: a first surface adapted for receiving a pressure applied thereto, an oppositely disposed second surface, and a flexing portion adapted to deflect when pressure is applied to the first surface; at least a first sensor formed on the second surface and adjacent to a center of the flexing portion, and adapted to measure the pressure applied to the first surface; at least a second gauge sensor formed on the second surface and adjacent to a periphery of the flexing portion, and adapted to measure the pressure applied to the first surface; a glass substrate secured to the second surface of the silicon wafer.

10 Claims, 7 Drawing Sheets

HIGH PRESSURE PIEZORESISTIVE TRANSDUCER SUITABLE FOR USE IN HOSTILE ENVIRONMENTS AND METHOD FOR MAKING THE SAME

This application is a divisional of U.S. patent application Ser. No. 09/245,158, filed Feb. 4, 1999, now U.S. Pat. No. 6,272,929.

FIELD OF INVENTION

The present invention relates to pressure transducers and more particularly to an improved high pressure piezoresistive transducer which is suitable for use in hostile environments and a novel, advantageous method for making the same.

BACKGROUND OF THE INVENTION

Kulite Semiconductor Products, Inc., the assignee herein, has previously made and patented a method for fabricating high pressure piezoresistive transducers using both longitudinal and transverse piezoresistive coefficients U.S. Pat. No. 5,702,619, entitled "Method of Fabricating a High-Pressure Piezoresistive Transducer", filed Sep. 30, 1996, and assigned to the assignee herein, the entire disclosure of which is hereby incorporated by reference. Therein, a basic sensor is formed from a piece of single crystal silicon to which sensors are dielectrically bonded on one surface and the other surface of the silicon is bonded to a glass support member. In those structures the piezoresistive elements were formed on the surface of the transducer that is directly exposed to the pressure media. Additionally, electrical contacts and lead wires are also exposed to the media.

This structure is undesirable in some situations, where exposure of the piezoresistive elements, electrical contacts and lead wires to the media shortens the life expectancy of the pressure transducer. Accordingly, it is an object of the present invention to provide a high pressure transducer less sensitive to the media.

SUMMARY OF INVENTION

A pressure transducer including: a silicon substrate including: a first surface adapted for receiving a pressure applied thereto, an oppositely disposed second surface, and a flexing portion adapted to deflect when pressure is applied to the first surface; at least a first sensor formed on the second surface and adjacent to a center of the flexing portion, and adapted to measure the pressure applied to the first surface; at least a second gauge sensor formed on the second surface and adjacent to a periphery of the flexing portion, and adapted to measure the pressure applied to the first surface; a glass substrate secured to the second surface of the silicon wafer.

DETAILED DESCRIPTION OF INVENTION

Figure 1:
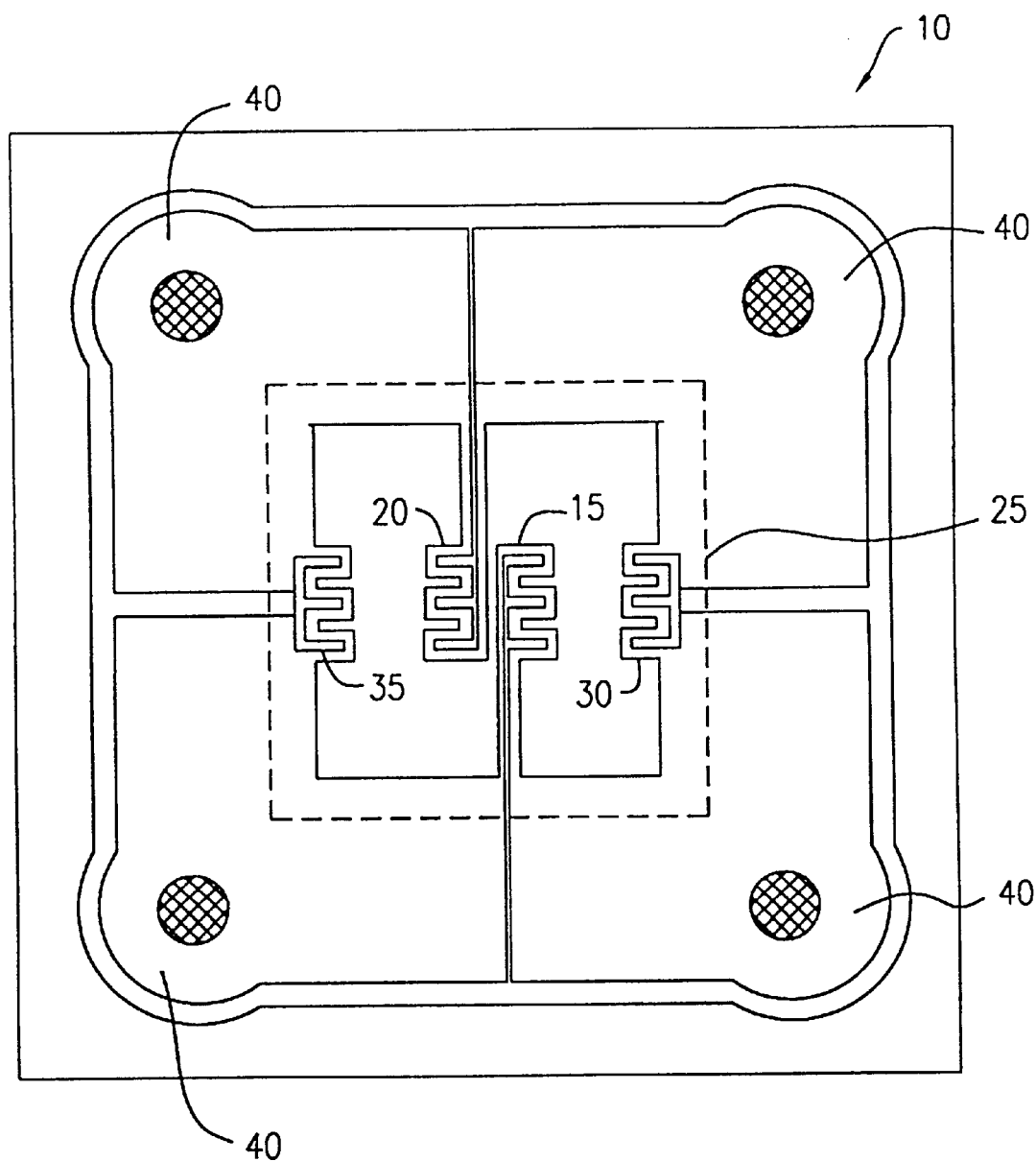
FIG. 1 illustrates a diagram of the approximate shape of a diaphragm with the resistor placement according to the present invention.

Referring now to the numerous figures, wherein like references refer to like elements of the invention, FIG. 1 illustrates a diagram of the approximate shape of a diaphragm with the resistor placement according to the present invention.

According to the present invention, piezoresistive elements are placed on a side of the silicon structure 10 isolated, or away, or opposite from a media. Preferably, two elements or gauges, 15, 20 are located near a center of flexing portion 25 of the silicon member 10, while two additional members or gauges 30, 35 are located just inside the flexing portion 25 area.

Figure 2:
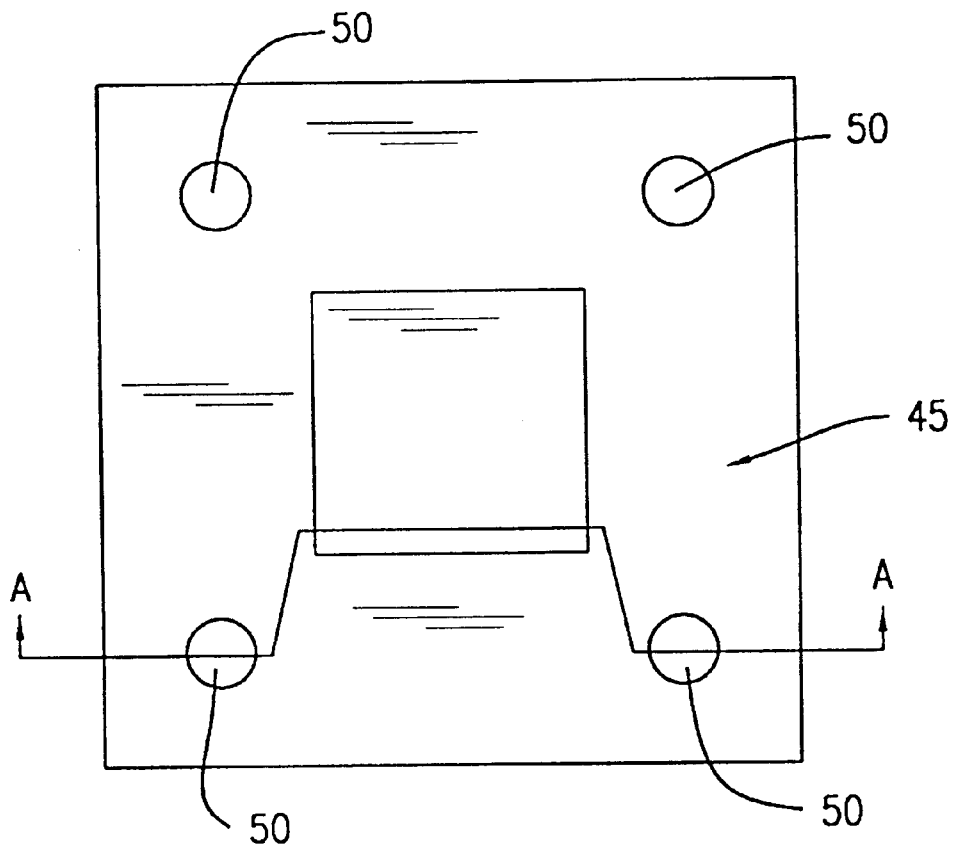
FIG. 2 illustrates a top view of a glass support to which the diaphragm of FIG. 1 is mounted according to the present invention.
Figure 3:
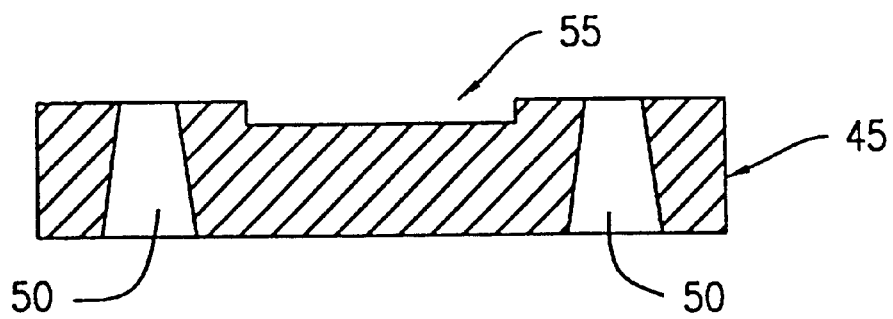
FIG. 3 illustrates a cross-section A—A of FIG. 2.

Contact areas 40 on the silicon structure 10 are sealed to a glass support structure 45 in a non-flexing area (complement of flexing area 25). Referring now also to FIGS. 2 and 3, holes 50 are provided in the glass support structure 45 to access the various contact areas 40 of the silicon structure 10 associated with sensors 15, 20, 30 and 35. Additionally, a small depression 55 to allow the flexing area portion 25 of the silicon structure 10 to deflect is provided. The sensor network (sensors 15, 20, 30 and 35) and contact areas 40 are preferably dielectrically isolated from the silicon structure 10 in the same manner as U.S. patent application Ser. No. 09/047,548, entitled "Compensated Oil-Filled Pressure Transducers" filed Mar. 25, 1998, the entire disclosure of which is also incorporated by reference hereinto, including the seal of the glass to a rim structure and to the contact areas 40.

Figure 4:
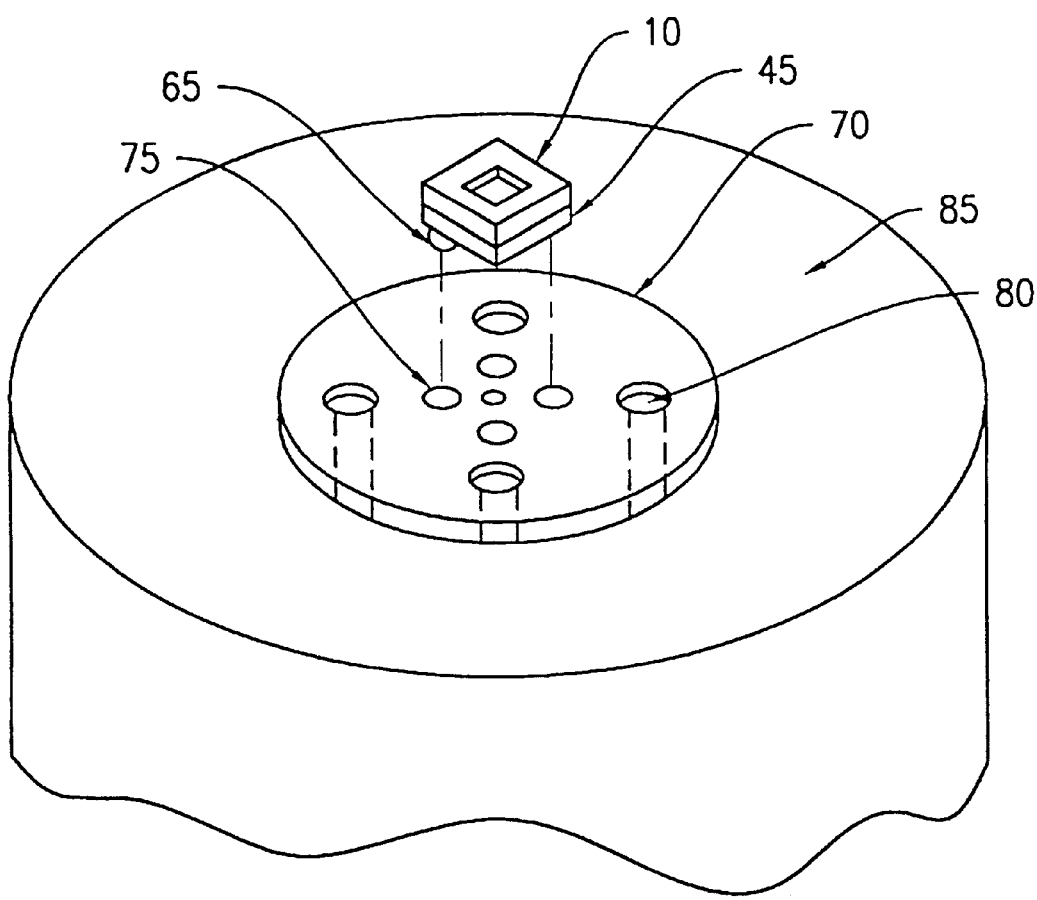
FIG. 4 illustrates the mounting of the diaphragm/support assembly to a header according to the present invention.
Figure 5:
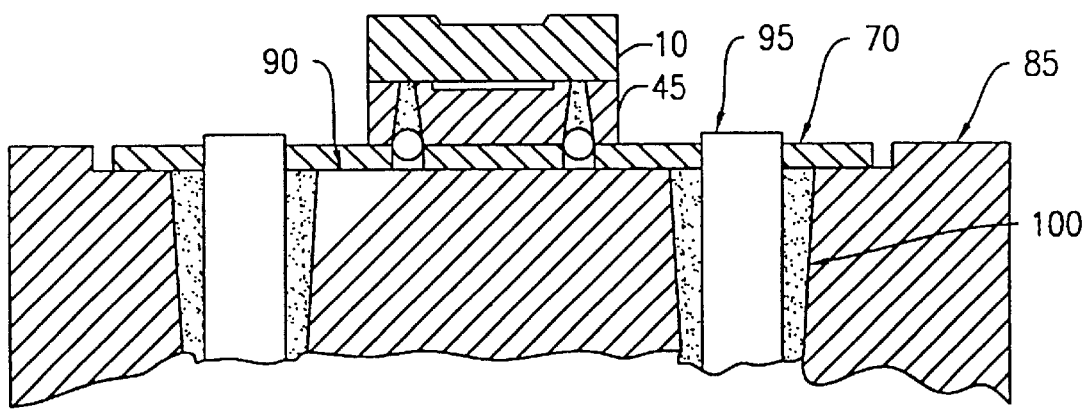
FIG. 5 illustrates a cross-section of a diaphragm/support and header according to the present invention.
Figure 9:
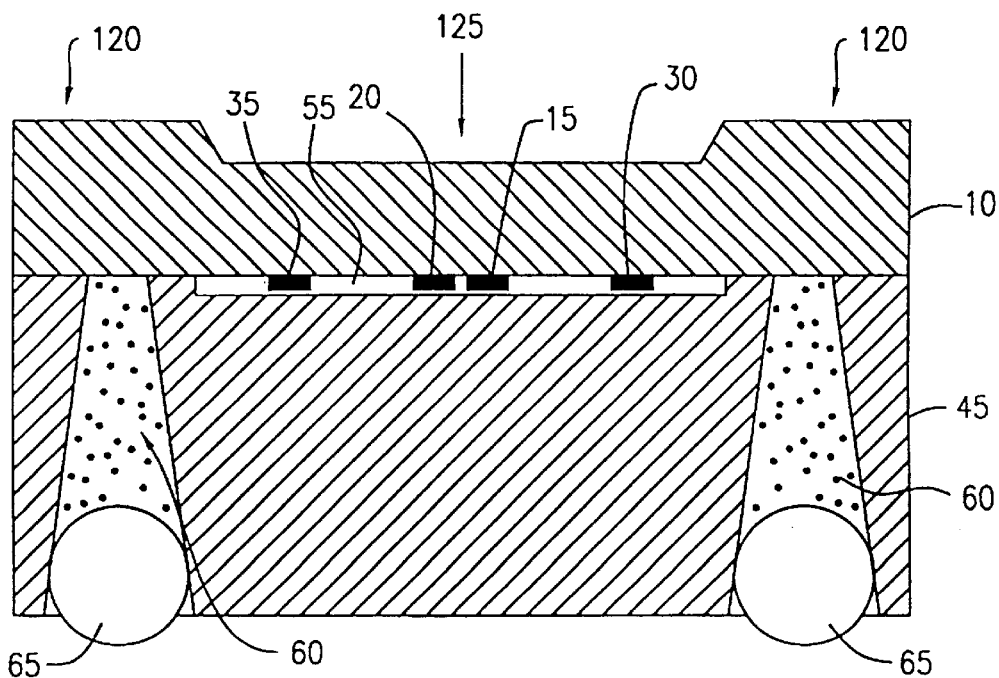
FIG. 9 illustrates a sensor assembly according to the present invention.

Referring now also to FIGS. 4 and 5, the apertures, or holes, 50 in the glass structure 45 are preferably partially filled with a metallic frit 60 (and or an epoxy metal frit for example) and small copper balls 65 are inserted in the back areas of the apertures 50 (also see FIG. 9). The sensor-glass support structure (collectively 10 and 45) is then mounted to either a polymide structure 70 or ceramic structure with plated through holes 75 into which the exposed portions of the copper balls 65 will seat.

Contact can be made between the balls 65 and plated through holes 75 with a solder or braze. If a polymide structure 70 is used, the sensor structure can be secured with an epoxy or like material, while if a ceramic structure 70 is used the mounting may be made using a glass type frit. However, both mounting surfaces contain lead outs, or metallizations 90 to a series of holes 80, sized in such a way to conform to the position of pins 95 on a header 85 preferably secured utilizing tapered glass 100.

The composite structure (10, 45 and 70) is then mounted on the header 85 allowing the interconnects and the composite structure (10, 45 and 70) to be electrically connected to the pins of the header 85. When pressure is applied from the side of the silicon not containing the sensor network, i.e. opposite thereof, the central portion of the silicon structure 10 deflects giving rise to a tensile surface strain in the center of the flexing member 25, while the exterior portions of the flexing member 25 will be put in compression.

Figure 6:
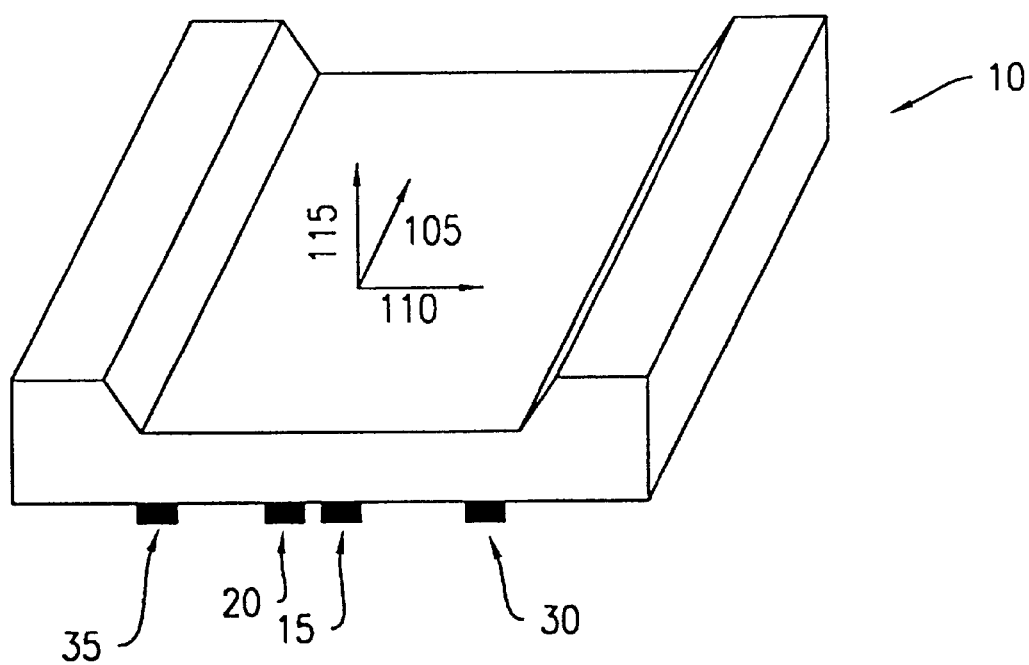
FIG. 6 illustrates a perspective view of gauge placement according to the present invention.

Referring now also to FIG. 6, methods of finite analysis were used to elucidate the various stresses within the plane of the silicon structure 10 (directions 105 and 110) and normal to it (direction 115). This analysis shows that the region of compressive surface stress in the flexing portion 25 where the sensor may be placed is very narrow. This is because the compressive normal stress in the center of the flexing region 25 is zero, but rises to its largest value at the outer edge of the flexing member 25, and because of the negative sign of the transverse gage factor in the <110> direction is negative. If the outer gauge is in this region, the change in resistance will be positive [(−1)×(−1)] and there will be no output.

In general, each gauge sees three different stresses: a longitudinal stress in the plane of the diaphragm (direction 110), a transverse stress in the plane of the diaphragm (direction 105), and a transverse stress perpendicular to the diaphragm (direction 115). These stresses serve to change the resistivity of the gauge through piezoresistive effects. In general this change in resistivity can be broken down into a change for each separate stress, namely:

$$\frac{\Delta R}{R} = \sigma_x \pi_x + \sigma_y \pi_y + \sigma_z \pi_z \quad (1)$$

where σ is the stress is one of the three directions and Π is the piezoresistive coefficient in that same direction.

By appropriate choice of crystallographic orientation, one skilled in the art can ensure the coefficient in the longitudinal in plane (110) and transverse out of plane (115) are equal in magnitude and opposite in sign, while the coefficient for the transverse in plane (105) is very close to 0. This leads for a final result for the change in resistance to be:

$$\frac{\Delta R}{R} = \sigma_{long}\left(\frac{\pi_{44}}{2}\right) - \sigma_{tran}\left(\frac{\pi_{44}}{2}\right) \quad (2)$$

By finite element analysis one can compute the transverse and longitudinal stresses that the gauges see and therefore choose the locations which yield the maximum change is resistance for a given load condition.

Figure 7:
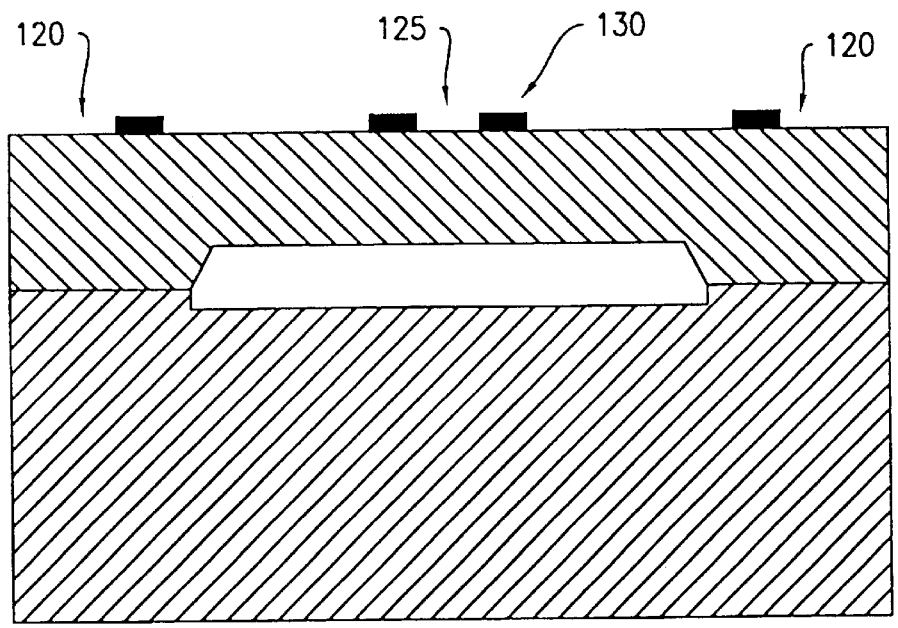
FIG. 7 illustrates a side view of a sensor assembly as described in U.S. Pat. No. 5,614,678.
Figure 8:
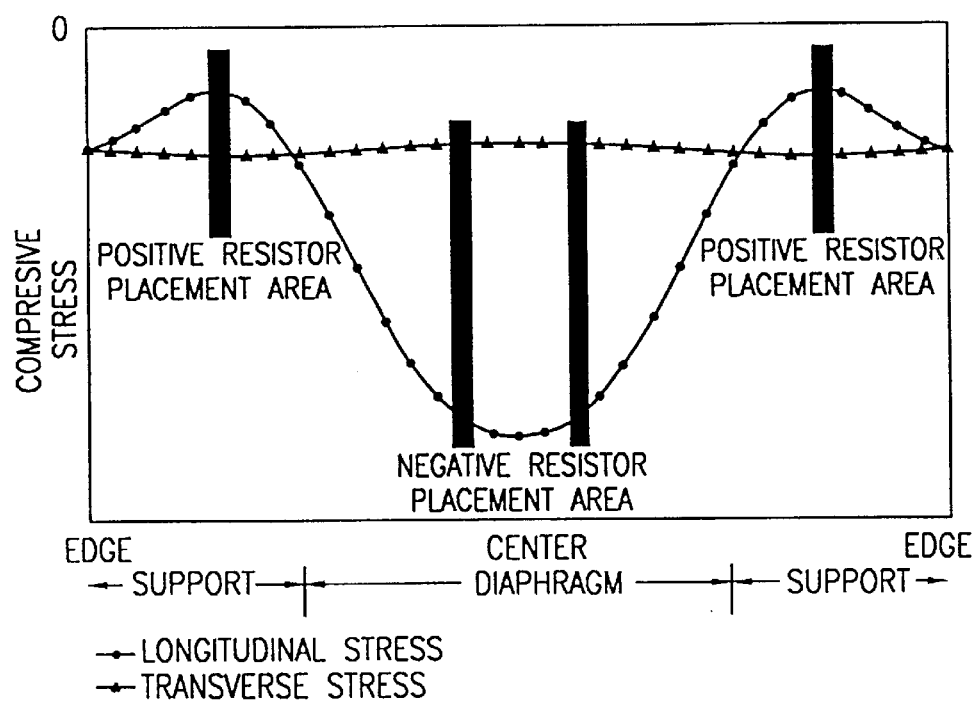
FIG. 8 illustrates a stress diagram for the sensor of FIG. 7.
Figure 10:
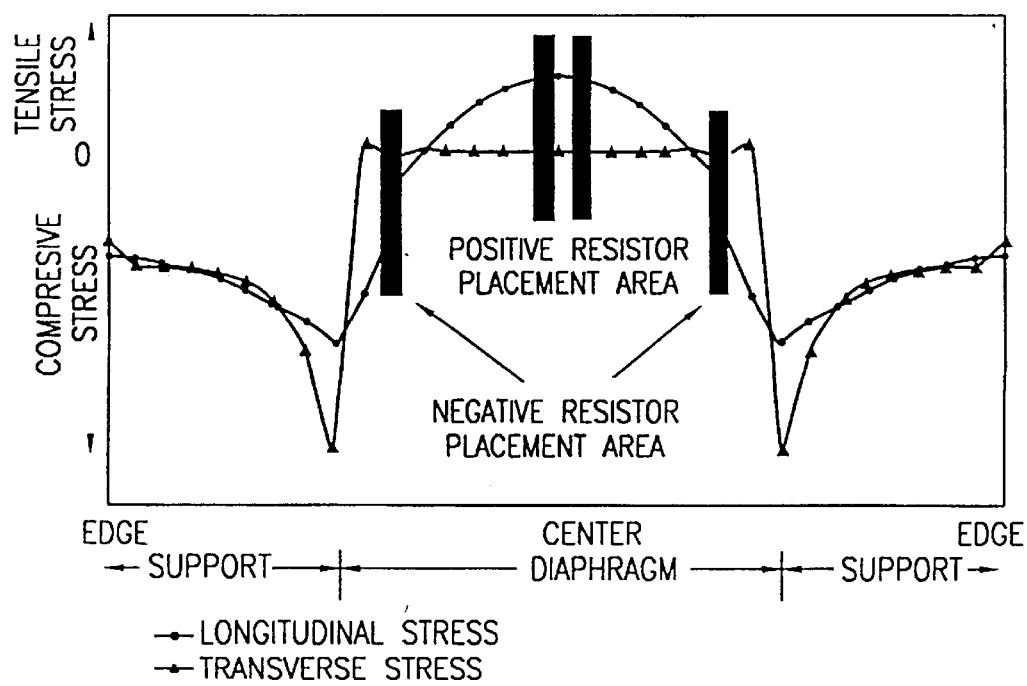
FIG. 10 illustrates a stress diagram for the sensor of FIG. 9.

Referring now also to FIGS. 7–10, therein is illustrated a not to scale drawing and a graph of the relevant stresses for both a conventional high pressure sensor (FIGS. 7–8) and the new leadless one (FIGS. 9–10). FIGS. 7 and 9 are for reference only and should be used to clarify FIGS. 8 and 10. FIGS. 8 and 10 illustrate the transverse and longitudinal stresses in the appropriate part of the diaphragm. FIGS. 8 and 10 also have marked the approximate locations for the placement of the gauges.

Referring first to FIG. 7, therein is illustrated a conventional pressure transducer including supports 120, diaphragm 125 and gauges 130.

It can be seen from FIGS. 8 and 10 that for each sensor there are two gauges which will see a negative change in resistance and two which will receive a positive change in resistance. By combining these four gauges in a wheatstone bridge as set forth in U.S. Pat. No. 3,654,579, entitled "Electromechanical Transducers and Housings" filed May 11, 1970, is assigned to the assignee hereof, also herein incorporated by reference, one can to achieve the desired change in voltage.

This new structure has a number of unanticipated advantages. The position of both the inner and outer gages was only learned by computation using finite element analysis and would be different for each geometry of the sensor but the large difference in surface stress distributed from the top to the bottom surface of the silicon was not anticipated. However, the use of the finite analysis still makes possible the fabrication of a miniature sensor.

By putting the sensing network on the side of the silicon away from the media and using glass support structures with access holes to reach the contacts, it makes possible the construction of a "leadless" structure without fine gold wires and ball bonds as is illustrated in pending U.S. patent application Ser. No. 09/160,976 entitled "Hermetically Sealed Ultra High Temperature Silicon Carbide Pressure Transducers and Method for Fabricating Same" filed Sep. 25, 1998. It also makes possible higher temperature application of the device since the contact material in the apertures is sealed from any high temperatures, hostile environment while still retaining all of the advantages of the structure disclosed in pending U.S. patent application Ser. No. 09/160,976 entitled "Hermetically Sealed Ultra High Temperature Silicon Carbide Pressure Transducers and Method for Fabricating Same" filed Sep. 25, 1998. Additionally, the use of a separate mounting surface for the sensor structure makes possible the use of a header specifically designed for high pressure while still employing a miniature sensor.

Having described the preferred embodiment of this invention, it is evident that other embodiments incorporating these concepts may be used. Accordingly, although the invention has been described and pictured in a preferred form with a certain degree of particularity, it is understood that the present disclosure of the preferred form has been made only by way of example and that numerous changes in the detail of construction in combination and arrangement of parts may be made without departing from the spirit and scope of the invention as here and after claimed. It is intended that the patent shall cover by suitable expression in the appended claims, the whatever features of patentable novelty exist in the invention disclosed.

We claim:

1. A method for making a pressure transducer comprising the steps of:

providing a silicon substrate including a first surface, an oppositely disposed second surface, and a flexing portion adapted to deflect when said pressure to be measured is applied to said second surface;

forming on said first surface and adjacent to a center of said flexing portion at least a first sensor adapted to measure a pressure applied to said second surface;

forming on said first surface and adjacent to a periphery of said flexing portion at least a second sensor adapted to measure said pressure applied to said second surface; and, sealing a glass substrate including a plurality of apertures to said first surface of said silicon substrate.

2. The method of claim 1, further comprising the steps of:

partially filling each of said plurality of apertures with a metallic frit;

inserting a conductive bead into each of said plurality of apertures; and, securing said glass substrate to a header adapted to at least partially receive each of said plurality of metallic beads.

3. The method of claim 2, further comprising the steps of:

coupling a plurality of pins to said header; and, respectively electrically coupling each of said balls to an associated one of said plurality of pins.

4. The method of claim 1, further comprising the step of forming on said first surface and adjacent to said center of said flexing portion at least a third sensor adapted to measure said pressure applied to said second surface.

5. The method of claim 4, further comprising the step of forming on said first surface and adjacent to said periphery of said flexing portion at least a fourth sensor adapted to measure said pressure applied to said second surface.

6. The method of claim 5, wherein said step of sealing said glass substrate to said first surface of said silicon substrate further comprises the step of isolating said at least first, second, third and fourth sensors from a media associated with said pressure to be measured.

7. The method of claim 5, wherein said step of forming said first, second, third and fourth sensors, further comprises the step of forming said first, second third and fourth sensors within said flexing area.

8. A method for forming a pressure transducer including a sensor network which is isolated from a media associated with a pressure to be measured, said method comprising the steps of:

forming on a first surface of a substrate including an oppositely disposed second surface and a flexing portion adapted to deflect when a pressure to be measured is applied to said second surface, and adjacent to a center of said flexing portion at least a first gauge adapted to measure said pressure applied to said second surface;

forming on said first surface and adjacent to a periphery of said flexing portion at least a second gauge adapted to measure said pressure applied to said second surface; and, sealing a glass substrate including a plurality of apertures to said first surface of said substrate and over said at least first and second gauges, thereby isolating said first and second gauges from said media associated with said pressure to be measured.

9. The method of claim 8, wherein said step of forming said at least first gauge comprises the step of forming said at least a first gauge in a first position selected such that a resistance associated with said first gauge decreases when said pressure to be measured is applied to said second surface of said substrate.

10. The method of claim 9, wherein said step of forming said at least second gauge comprises the step of forming said at least second gauge in a second position selected such that a resistance associated with said second gauge increases when said pressure to be measured is applied to said second surface of said substrate.

* * * * *